May 23, 1939.    J. M. MARKLEY, JR    2,159,727
RECORDING MECHANISM FOR VEHICLES
Filed July 11, 1935    5 Sheets-Sheet 1
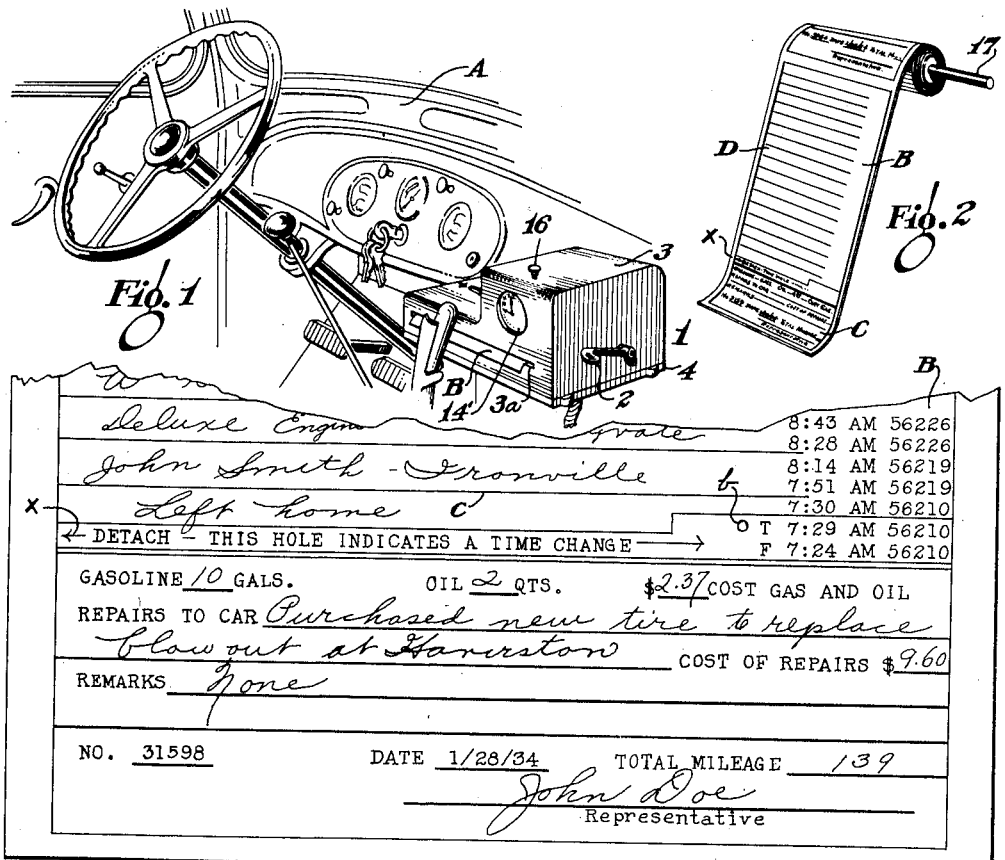
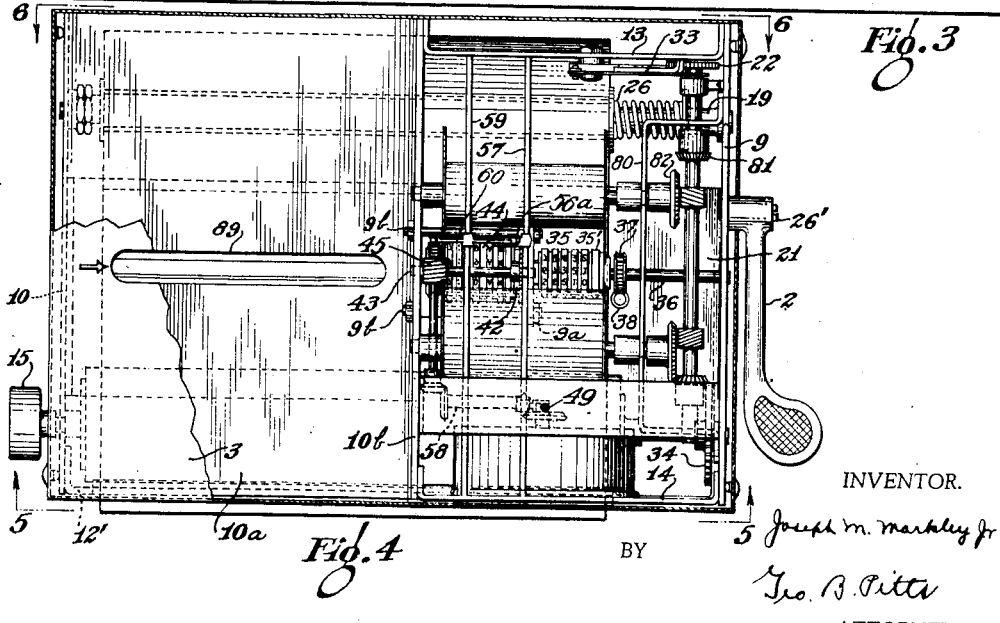
INVENTOR.
Joseph M. Markley Jr
BY
Geo. B. Pitts
ATTORNEY.

May 23, 1939.  J. M. MARKLEY, JR  2,159,727
RECORDING MECHANISM FOR VEHICLES
Filed July 11, 1935  5 Sheets-Sheet 2
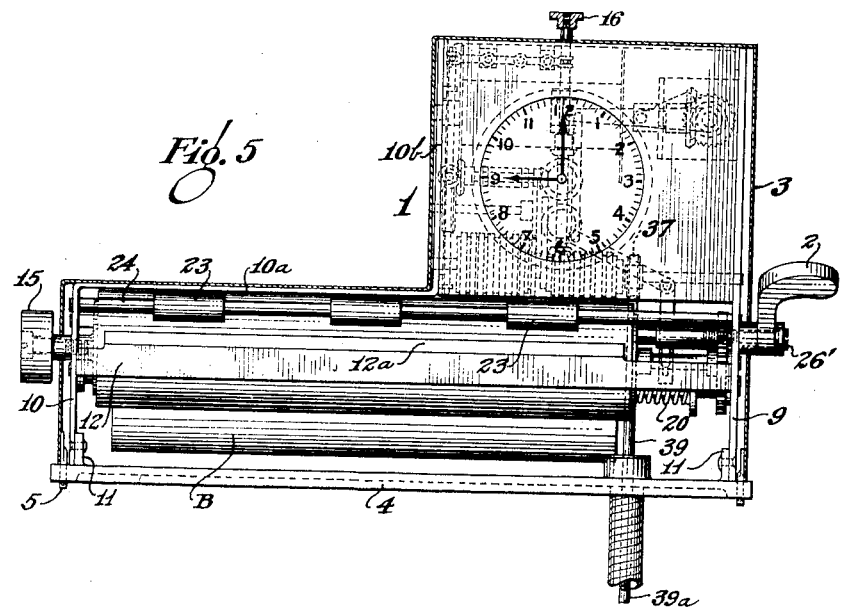
INVENTOR.
Joseph M. Markley Jr
BY Geo. B. Pitts
ATTORNEY.

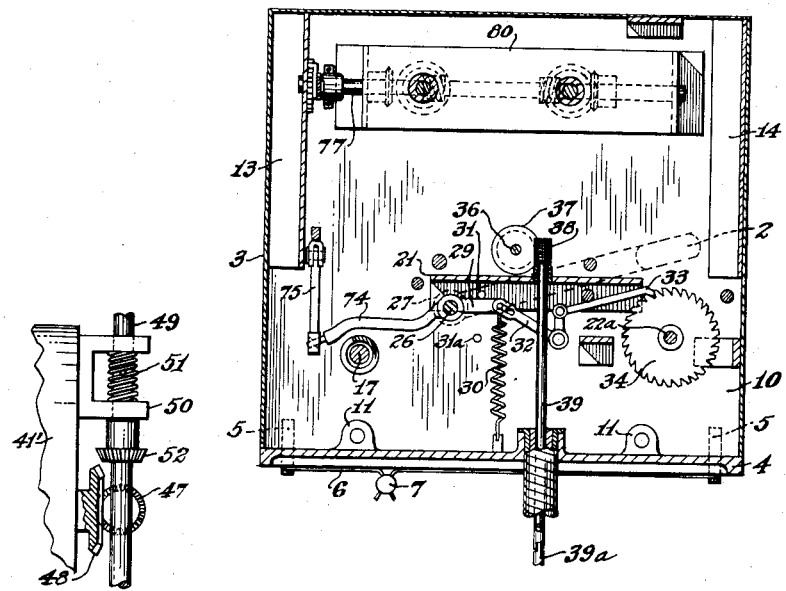
Fig. 7
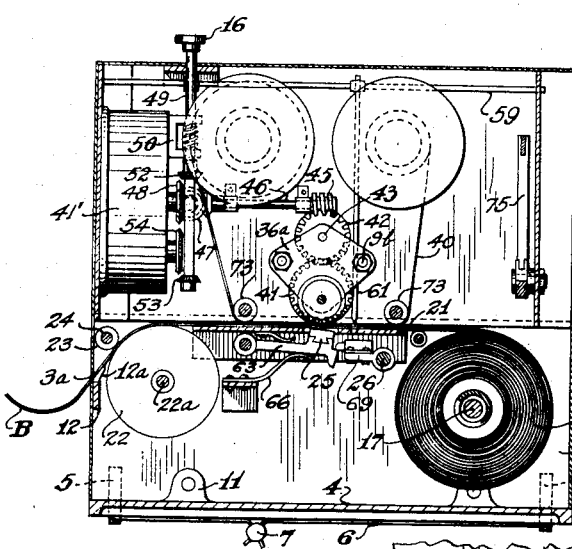
Fig. 8a
Fig. 8
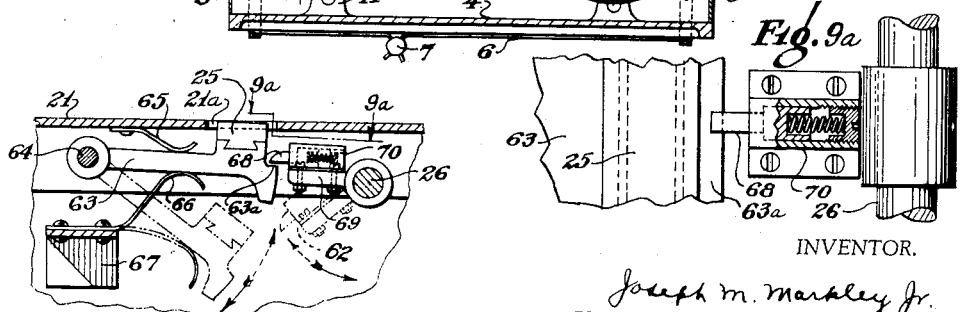
Fig. 9
Fig. 9a
INVENTOR.
Joseph M. Markley Jr.
BY Geo. B. Pitts
ATTORNEY.

May 23, 1939.  J. M. MARKLEY, JR  2,159,727
RECORDING MECHANISM FOR VEHICLES
Filed July 11, 1935   5 Sheets-Sheet 4

INVENTOR.
Joseph M. Markley Jr
BY Geo. B. Pitts
ATTORNEY.

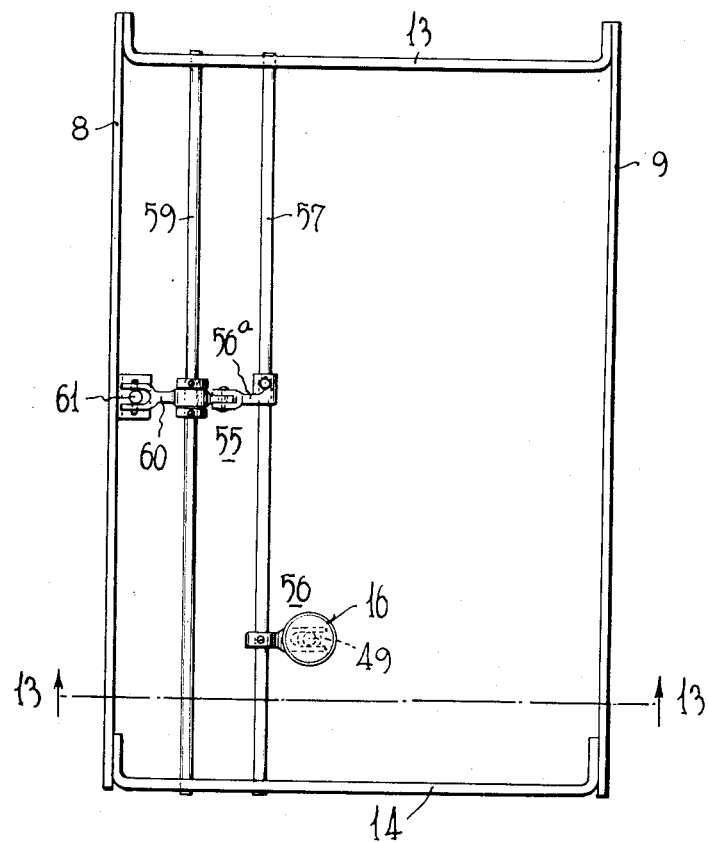
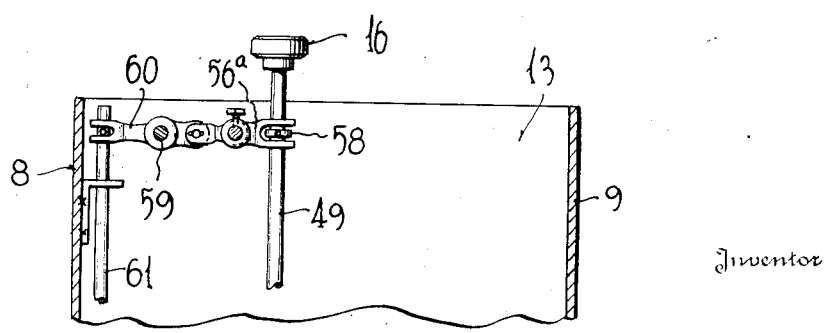

Patented May 23, 1939

2,159,727

UNITED STATES PATENT OFFICE 2,159,727

RECORDING MECHANISM FOR VEHICLES

Joseph M. Markley, Jr., Canton, Ohio, assignor of one-half to Myron D. Markley, Canton, Ohio Application July 11, 1935, Serial No. 30,911

1 Claim. (Cl. 234—2)

This invention relates to a mechanism for recording the operation of a vehicle for any period of time, whereby, in the use thereof, the time required and distance traveled and other information may be completely and correctly recorded.

The mechanism serves as a means for recording the number of miles the vehicle is driven for each trip, the time of day, time occupied for the trip and time the vehicle is not in use between trips. The driver and the owner of the vehicle will have, by operation of the mechanism, a permanent record of the operation of the vehicle for any predetermined period; that is, each day or week or month. The mechanism is so arranged as to permit the recording of data opposite each mileage and time record. The mechanism, in addition to providing a record of the use of the vehicle, enables the owner to compute the operating expense in connection with the trip or total mileage and time occupied.

One object of the invention is to provide an improved mechanism of this character having time and mileage computing mechanisms and printing means for recording at desired intervals the time and mileage, whereby the operation of the vehicle with respect to the distance traveled and time the vehicle is in use and idle is registered and reported.

Another object of the invention is to provide an improved mechanism of this character having time and mileage computing means and a printing means for recording the time and mileage including a web feeding means so arranged that any desired data may be written on the web opposite each record printed thereon.

Another object of the invention is to provide a mechanism of this character that is relatively simple in construction, accurate in operation and readily manufactured.

Other objects of the invention will be apparent to those skilled in the art to which my invention relates from the following description taken in connection with the accompanying drawings, wherein Fig. 1 is a perspective view of a portion of a vehicle having mounted therein a mechanism embodying my invention.

Fig. 2 is a perspective view of the paper web which is mounted in the casing for the mechanism for receiving time, mileage and data to be recorded.

Fig. 3 is a fragmentary portion of the web, enlarged.

Fig. 4 is a plan view, a portion of the casing being broken away to facilitate the illustration.

Fig. 5 is a view on the line 5—5 of Fig. 4, with the wall of the casing removed.

Fig. 6 is a view on the line 6—6 of Fig. 4, with the wall of the casing removed.

Figs. 7 and 8 are sections on the lines 7—7 and 8—8, respectively, of Fig. 6.

Fig. 8a is a detail view of the means for setting and winding the clock.

Fig. 9 is a fragmentary view of parts shown in Fig. 8 illustrating the operation thereof.

Fig. 9a is a sectional view illustrating a detail of the means for operating the platen of the recording printing mechanism.

Figure 10:
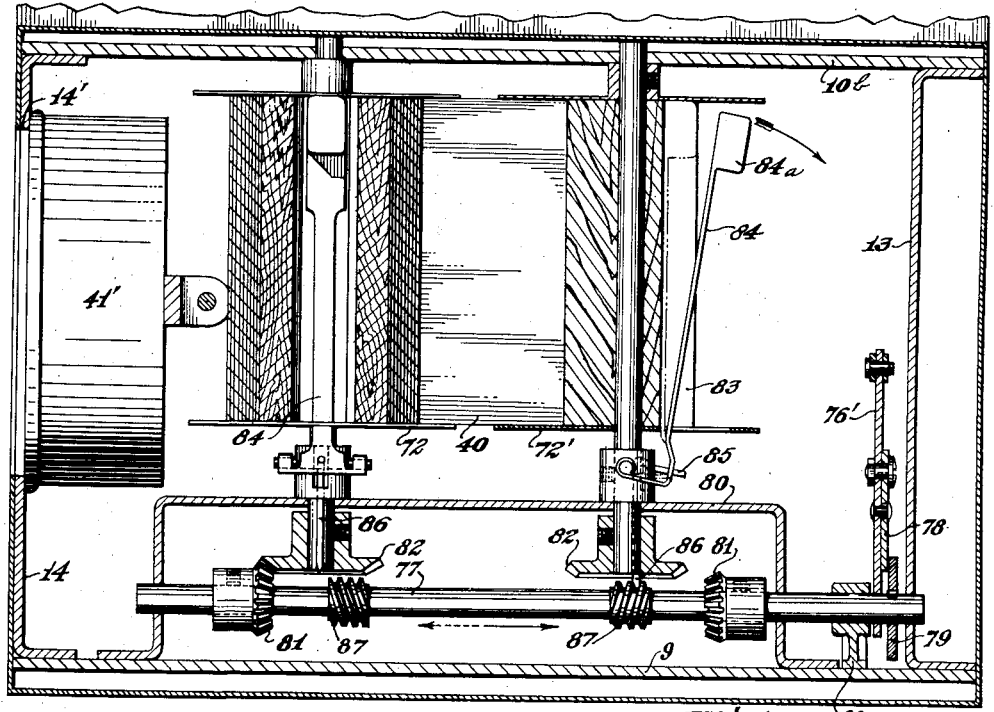

Fig. 10 is a section on the line 10—10 of Fig. 6, enlarged.

Figure 11:
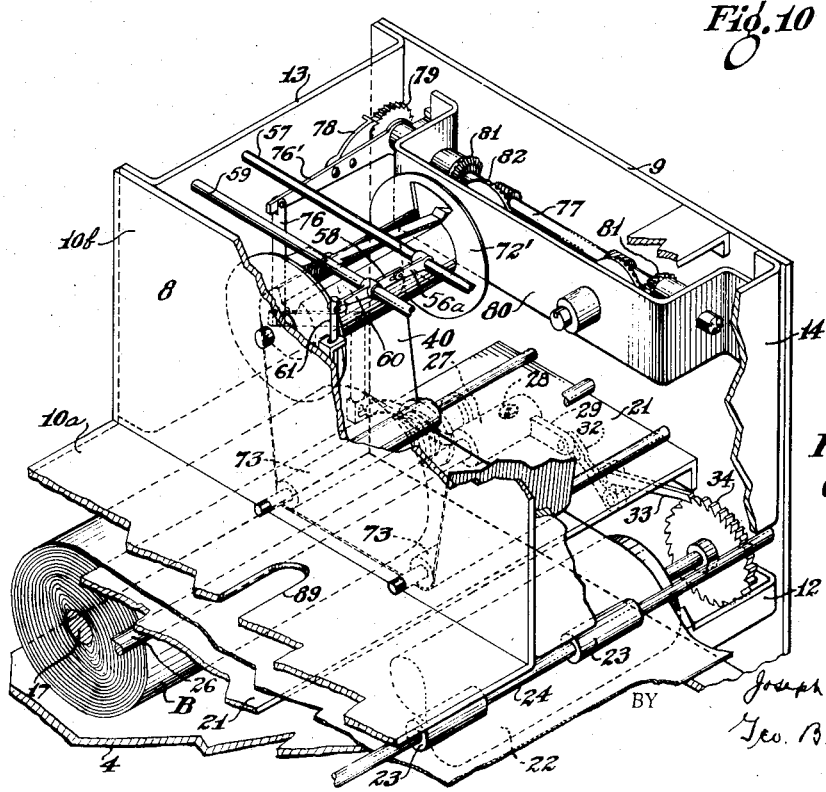

Fig. 11 is a perspective view.

Fig. 12 is a fragmentary plan view illustrating the means for indicating the change of the time recording discs and clock hands.

Fig. 13 is a section on the line 13—13 of Fig. 12.

In the drawings, A indicates a vehicle showing the mounting therein of my improved mechanism indicated as an entirety at 1. The mechanism may be mounted in any desired position, but preferably in close relation to the instrument board for the vehicle, whereby an operating device 2 (to which reference will later be made) may be conveniently operated by the driver. When the mechanism 1 is mounted on the floor of the vehicle A, the device 2 may be operated by the foot of the driver.

3 indicates a casing enclosing the mechanism and secured to a support or bottom plate 4. The side walls of the casing are provided with depending ears 5 which project through openings formed in the plate 4 and serve to secure the casing thereto. The end portions of the ears 5 are formed with openings to receive a wire 6, the ends of which may be connected by a sealing slug 7, whereby access to the mechanism by unauthorized persons is prevented. In the arrangement shown, the ears at each side of the casing are sealed by a wire 6 and slug 7.

8 indicates as an entirety a frame secured to the support or plate 4 and arranged to support the parts of the mechanism as hereinafter set forth. The frame 8 preferably comprises side members or walls 9, 10, riveted at their lower edges to up-standing lugs 11 provided on the plate 4. The member 10 is extended inwardly to provide a horizontal section 10a and a vertical section 10b. The horizontal section 10a is disposed in a plane between the upper and lower edges of the member 9 and at its inner end the vertical section 10b extends upwardly and terminates in the plane of the upper end of the member 9. The members 9, 10, below the section 10a are connected by a bar 12 and the member 9 and vertical wall 10b are connected by spacers 13, 14. In this arrangement provision is made for a portion of a paper web B to move below the horizontal wall section 10a and below the space between the wall section 10b and side wall 9 for purposes later to appear. As the frame 8 above described preferably defines the area or space occupied by the mechanism or parts, the casing 3 is shaped to fit over and around the frame so that when it is connected to the support 4, as already set forth, the mechanisms and parts are entirely enclosed except for the operating device 2, a knob 15 for delivering a portion of the paper web B and a button 16 later referred to. The paper web is supplied in the form of a roll mounted on a sectional shaft 17 removably mounted in the walls 9, 10. One end of the shaft removably and rotatably fits a fixed collar 18 mounted on the wall 10. The other end of the shaft carries an endwise slidable collar 19 normally biased by a spring 20 outwardly, the outer end of which removably and rotatably fits a stud 20a carried by the wall 9. By sliding the collar 19 inwardly on the shaft, it may be disengaged from the stud 20a and thus permit the removal of the shaft. The friction between the shaft end with the collar 18 and between the sleeve or collar 19 and stud 20a provides sufficient resistance to prevent the roll B from unwinding except when it is fed forward as later set forth upon operation of the device 2 or knob 15. The web B is guided over a plate 21 to a feed roll 22 which is rotated in the manner hereinafter set forth to move the web B a predetermined distance in each operation of the device 2. The web B is pressed into engagement with the feed roll 22 by a series of presser rolls 23 spacedly mounted on a shaft 24. The shaft 24 and shaft 22a for the feed roll 22 are suitably supported in the walls 9, 10. The knob 15 is detachably connected to the feed roll shaft 22a in any suitable manner, so that the knob may be connected thereto after the casing 3 is positioned. The knob 15 serves as the means by which the feed roll 22 may be rotated manually to feed any desired portion of the web B through a slot or opening 3a formed in the wall of the casing 3 (see Fig. 8). The bar 12 is preferably provided with a guide wall 12a to direct the web B through the opening. The edge of the opening 3a may serve as a tearing edge to facilitate severing that portion of the web that is fed outwardly or delivered by rotation of the knob 15. The plate 21 is suitably supported at its opposite ends on the walls 9, 10, in a plane below the horizontal wall section 10a. The plate 21 is formed with an opening 21a (Figs. 8 and 9) extending transversely to the feed of the web B to permit operation of a platen 25 at the time each record is to be made by the operation of the device 2. The device 2 is detachably connected to a rock shaft 26 by means of a screw 26' so that the device may be connected to the shaft after the casing 3 is positioned and sealed to the support 4. The shaft 26 is suitably mounted at its opposite ends in the side walls 9, 10. At one end, the shaft 26 carries a sleeve 27 angularly adjustable thereon and fixed in adjusted position by a set screw 28. The sleeve 27 is provided with an arm 29 to which is connected an expansion spring 30 (see Fig. 7) arranged to normally bias the shaft in one direction, that is, to swing the device 2 upwardly (clockwise as shown in Fig. 1), which movement is limited by the engagement of the arm 29 with a stop 31 provided on the wall 10. The arm 29 is pivotally and slidably connected to one arm of a bell crank 32 suitably mounted on the wall 10, the other arm of the bell crank being provided with a pawl 33 which engages a ratchet wheel 34 fixed to the shaft 22a. The elements just referred to are so arranged that in the downward movement of the device 2, the pawl 33 rides the teeth of the ratchet 34, but engages therewith in the return movement of the device 2, under the influence of the spring 30, to rotate the ratchet 34 and effect a feed of the web B relative to the opening 21a. By providing a stop 31a, preferably on the wall 10 as shown in Fig. 7, to limit the downward movement of the device 2, the pawl 33 will ride a predetermined number of teeth in each downward operation of the device and thus in its return movement effect a feed of the web B equal distances. This arrangement and operation permits the printing record to be made on the web prior to any feeding movement thereof and to thereafter move or feed the web a predetermined distance ready for the succeeding record.

35 indicates a set of disks comprising a mileage registering mechanism of any desired construction except that each disk carries on its periphery printing characters consisting of the numbers 0 to 9. The disk carrying the numbers representing the units column is drivingly connected to a diven disk 35', keyed to a shaft 36. The driving connection between the disk 35' and adjacent number carrying disk serves to operate the latter intermittently so that a number thereon will be at the printing position during each rest period. The respective operating connections between the disks are so arranged that when one disk completes one revolution, it will move the next disk one step, that is, to the next higher number thereon, so that the mileage is registered and may be recorded at will as later set forth. The disks 35 are substantially similar in construction and operation to like mechanisms on self-propelled vehicles to indicate the total mileage thereof at all times, for which reason a detail illustration and description of the disks and operating means therefor will not be required for a full disclosure of my invention. The shaft 36 is provided with a worm gear 37 that is in mesh with and driven by a worm 38. The shaft 36 is mounted at one end in the wall 9 and at its opposite end in a plate 9a. The plate 9a is supported by the wall 10b, by means of bolts 9b, sleeves surrounding the bolts being interposed between the plate and wall to form spacers. The worm 38 is fixed to one end of a shaft 39 mounted in suitable bearings provided in the plate 4, the opposite end of the shaft being connected to a flexible shaft 39a which is driven by some driven element of the vehicle in a well known manner. As shown, the disks 35 are so arranged that the numbers on the lower portions thereof are in juxtaposition to the opening 21a, so that the platen 25, when operated, will press the web against such numbers and effect printing on the web by means of an interposed ribbon 40. As the device 2 is intended to be operated before the driver starts on a trip and at the end of the trip (while the vehicle is at rest), the disks will always at such times be in position to permit a printed record therefrom to be made.

41 indicates a set of disks for registering the time and arranged to be driven by a suitable clock mechanism 41' mounted on the spacer 14. The face of the clock mechanism is related to registering openings 14' formed in the spacer 14 and casing 3 (see Figs. 1 and 10). The disks carry numbers and the letters "AM" and "PM", which serve as printing characters, those characters which are at any time on the lower portions of the disks being related to the opening 21a, whereby a printed record may be made on the web B by the platen as later set forth. One disk carries the numbers 1 to 12 representing the hours; the next disk carries the numbers 1 to 6 representing the tens-of-minutes; the third disk carries the numbers 1 to 10 representing the unit minutes; and a fourth disk carries the characters "AM" and "PM". The printing letters AM appear twelve times on one half of the periphery of the fourth disk and the printing letters PM appear twelve times on the other half of the disk periphery, making a total of 24 printing positions, one for each hour of a complete day. The disks 41 are similar in size and drivingly connected, but as the fourth disk makes one revolution in 24 hours, the third disk carries ten numbers and makes one revolution each hour, the second disk carries six numbers and makes one revolution in each hour and the first disk carries twelve numbers and revolves twice in each 24 hour period or a complete day. These connections are of a differential type, so that in each angular movement of one disk the adjacent disk or disks are proportionately moved to bring their respective printing characters or elements into alignment at the printing position. The fourth disk is driven intermittently by a gear having on its periphery teeth in mesh with a gear 42. The gear 42 is fixed to a shaft 43 suitably supported by the wall 10b and plate 36a. The shaft 43 has fixed to it a worm gear which meshes with a worm 45. The worm 45 is fixed to one end of a shaft 46; the opposite end of the shaft carries a bevel gear 47 which meshes with a bevel gear 48 fixed to a driven shaft of the clock mechanism 41'. Means are provided for at will setting the clock and winding its spring. These means preferably comprise a shaft 49 (Figures 8 and 8ª) rotatably and slidably supported in the arms of a U-bracket 50 fixed to the rear wall of the clock mechanism 41'. The shaft 49 is provided with a pair of diametrically arranged outwardly extending pins 51 which inter-lock with the convolutions of a spring coiled around the shaft and engaging at its opposite ends the bracket arms. The spring normally acts to support the shaft in a predetermined position, but permits it to be moved endwise in either direction, the pins serving to put the spring under tension when the shaft is so moved. The shaft 49 carries at spaced positions two bevel gears 52, 53. When the shaft 49 is moved downwardly, the gear 52 engages the gear 48; then if the shaft 49 is rotated, the clock 41' and disks 41 may be set to the desired position according to the time of day. When the shaft 49 is moved upwardly, the gear 53 engages a gear 54, which is fixed to the shaft of the clock mechanism 41' that winds the main spring thereof; then if the shaft 49 is rotated the clock spring may be wound. If found desirable or necessary, an auxiliary spring (not shown) may be provided to supplement the power of the main spring of the clock mechanism 41' to insure positive drive of the disks 41. The auxiliary spring may be connected to the shaft driven by the clock main spring or to the shaft 43 or 46. The shaft 49 carries at its upper end the button 16 (already referred to) which is preferably removably threaded on the shaft, as shown in Fig. 5, to permit the positioning and removal of the casing 3.

55 indicates as an entirety means for indicating on the web B the operation of setting or re-setting the clock mechanism 41', so that the time record and/or its relation to the mileage record cannot be changed without detection. The means 55 are preferably of a form to punch a hole b in the web each time the shaft 49 is moved downwardly to effect a setting of the clock 41'. In Fig. 3 the hole b is shown opposite the time and mileage record "7:29 AM 56210", which indicates that the device 2 was operated at the time the setting was made. The means 55 comprise the following: 56 indicates a lever means comprising an arm 56', a rod 57 to which the arm is suitably fixed and an arm 56a. The rod 57 is mounted at its ends on the spacers 13, 14 (Fig. 4). One end of the lever is bifurcated to straddle the shaft 49 and the bifurcations are formed with slots to receive a projection 58 provided on the shaft, so that when the shaft 49 is moved endwise the lever 56 is rocked. The outer end of the lever arm 56a is pivotally and slidably connected to an arm 58 fixed to a rock shaft 59. The rock shaft 59 is mounted at its ends on the spacers 13, 14, and carries intermediate its ends a second arm 60 to which is pivotally attached a plunger 61 the terminating end of which is sharpened to permit it to effect the punching of the holes b in the web B. The parts of the indicating means 55 are so arranged that in their normal or non-operating position the sharpened or cutting end of the plunger 61 is slightly above the plane of the web B, but upon movement of the shaft 49 downwardly, to effect engagement of the gear 52 with the gear 48, the plunger 61 will be simultaneously operated downwardly and thus form a hole in the web. To permit of this operation the plate 21 is formed with an opening to receive the plunger 61 when the latter is operated.

62 indicates as an entirety means for supporting and operating the platen 25, whereby a record of the time and mileage may at will, be made on the web B. Of these means, 63 indicates an arm swingably mounted on a stud shaft 64 projecting from the adjacent flange of the plate 21 and carrying at its outer end the platen 25. 65, 66, indicate a pair of flat springs, the former being suitably supported on the lower side of the plate 21 and the latter being suitably supported on a bracket 67 fixed to the wall 10. The outer ends of the springs 65, 66, normally tend to swing the arm 63 in opposite directions and accordingly coact to support it in an intermediate position ready for operation but below the plane of travel of the web B (see Fig. 9). To operate the platen 25 and effect a printing from the disks 35 and 41, the arm 63 is swung downwardly against the tension of the spring 66 and then released, thereby permitting the spring 66 to impel the arm upwardly with considerable force or momentum, the effect of which is to cause the platen to press the web against the printing characters on the disks 35, 41, and by reason of the interposed inked ribbon 40, to produce a record on the web. The arm 63 is moved downwardly and released by a dog 68 mounted on an arm 69 which is fixed to the shaft 26. The dog 68 engages a projecting ledge or wall 63a provided on the free end of the arm 63. As the wall 63a and dog 68 traverse arcs extending in opposite directions, the dog 68, when operated downwardly, will first swing the arm 63 about its axis and then free itself from the wall, which will then permit the spring 66 to impel the arm upwardly. By operating the device 2 with a quick movement, the arm 63 may be swung downwardly beyond that position where the dog 68 frees itself from the wall 63a, the effect of which is to cause the platen to strike the printing characters with a relatively hard blow, this manner of operating being advantageous when the ribbon 40 becomes more or less worn. The body or tail portion of the dog 68 is slidably supported in a casing 70 which is suitably bolted to the arm 69. The casing 70 houses an expansion spring 71 which is interposed between the tail of the dog and rear wall of the casing and normally tends to slide the dog outwardly, but permits the dog to ride the end wall of the ledge 63a in the return movement of the dog and shaft 26 under the influence of the spring 30.

The ribbon 40 is mounted on suitable spools 72, 72', and guided around a pair of rolls 73 the shafts for which are supported in the walls 10b and 9, the rolls 73 being arranged to guide the ribbon parallel to the web B as the latter moves over the opening 21a. The ribbon 40 is fed step-by-step by connections from the shaft 26 which effect movement of one spool in the winding direction each time the device 2 is operated; when the ribbon is unwound from the other spool, the connections are automatically made with the other spool to reverse its direction of movement. To effect these operations, the shaft 26 is provided with an arm 74. The arm 74 is pivoted to one arm of a bell crank 75, the other arm of which is pivoted to a link 76, which in turn is pivoted to a bar 76' swingable about the axis of a shaft 77. The bar 76' is provided with a pawl 78 arranged to engage a ratchet 79 keyed to the shaft 77, so in the movement of the bar in one direction, the shaft 77 is rotated a predetermined distance. The shaft 77 is slidably and rotatably supported in the side portions of a U-frame 80 fixed to the wall 9 and is provided with bevel gears 81 one of which engages a similar gear 82 on the shaft of one spool to wind the ribbon thereon and the other of which engages a similar gear on the shaft of the other spool, upon the sliding or shifting of the shaft 77 endwise. The shifting of the shaft 77 is effected by the following mechanism: each spool is formed with a recess 83 to receive a bar 84. The bar 84 is pivotally mounted on a collar fixed to the spool shaft adjacent its gear carrying end. The bar 84 is held in its recess by the ribbon, but when the end of the ribbon in unwinding from the spool is reached, the bar swings outwardly under the influence of a weight 84a thereon. The bar 84 is formed adjacent its inner end with an opening through which extends the arm 85 of a pin 86. The pin 86 is slidably mounted in a recess formed in the spool shaft. The arm 85 through its engagement with the walls of its opening serves as a cam so that when the bar 84 swings outwardly the pin 86 is projected beyond the adjacent gear and when the bar is swung inwardly into its recess, the pin 86 is retracted. When the pin 86 is projected outwardly it engages a worm 87 on the shaft 77 so that through the succeeding rotative movements of the latter it is shifted to cause disengagement of one gear 81 from the adjacent gear 82 and engagement of the other gear 81 with the adjacent gear 82. That end of the shaft 77 carrying the ratchet 79 is extended so as to project through a bracket 88 supported on the wall 9 and an opening in the latter wall, and the bar 76' and ratchet 79 are disposed between this bracket and wall and are held thereby against movement with the shaft when the latter is shifted in either direction.

The wall 10a and adjacent portion of the casing 3 are formed with elongated openings 89 in registering relation to expose that portion of the web B therebelow. These openings permit the driver to write on the web any data he desires. The openings 89 are preferably arranged opposite the platen opening 21a so that the data will be opposite a printed record, so that the data may be identified therewith. As the web B may be moved any time independently of the operation of the device 2, by turning the knob 15, the web may be moved any desired distance to accommodate all of the data desired to be written thereon. The web B may be printed with lines C and at spaced portions it may be printed to provide spaces for receiving special data, such as the number of gallons of gasoline and oil purchased, the cost thereof, repairs, date, total mileage and driver's name.

The mechanism is operated in the following manner: before starting on a trip, an entry is written on the web, for example, "left home" and the device 2 is operated. This latter operation records the time and the mileage as registered by previous driving of the car. Upon arrival at the driver's first destination, the device 2 is operated to record the time and mileage registered by the disks 35 and 41. Before starting for the next destination, an entry may be made through the openings 89 on the web to explain the stop and then the device 2 is operated to record the time of starting and mileage for the next destination. Such record will show the length of the stop and the same mileage as recorded at the time the stop was made, thereby showing that the car was not driven during the intervening period. These operations are repeated at the end of each trip and at the beginning of the succeeding trip. Thus it will be seen that at the end of any predetermined period (day, week or month, or fraction thereof), a complete record showing the distance traveled between stops, time occupied in making each trip and time occupied at each stop, is made. At the end of the predetermined period, that portion of the web B carrying the record may be severed from the main portion of the web and filed away for reference and accounting purposes.

The mechanism is particularly adapted for use in connection with a car or cars that are used by employees as it enables the owner or employer to check the use of the cars. As provision is made to make on the web opposite each time and mileage record entries respecting stops, expenditures and other desirable information, the car owner is provided with a complete record. If no entry appears on the space opposite any two adjacent time and mileage records, the owner can readily check such discrepancy. Likewise, if the driver fails at the end of a trip or the beginning of the succeeding trip or fails at both the end of one trip and the beginning of the next trip, to operate the device 2, the time and mileage on the next record will be out of proportion to the actual mileage traversed between such record and the previous record on the web, so that the owner will be informed thereof and given opportunity to check the same. Since the records on the web are only made at the end of a trip and at the beginning of the next trip and each such record shows the time it is made and the accumulated mileage, any mis-use of the car as by making private stops or driving the car on the part of the driver for his private use is readily indicated.

The web B may have printed on its face at predetermined spaced points indicated spaces C for making entry of special items, such as the number of gallons of gas and oil purchased, repairs made, cost of these items, license or other identifying number of car, date, mileage and name of driver and instructions to detach the used section of the web at the point $x$. The printed portions of the web may be spaced sufficiently so that the intermediate portions D of the web will accommodate the time and mileage records for one day's time. In this arrangement each portion D and an adjacent portion C will constitute a day's record and report. If, however, the time and mileage records require more space, in a day's time, the web may be advanced to the succeeding portion D and used for the required records.

The portion C (see Fig. 3) may also include a space designated "F" and a space designated "T", so that at the commencement of a day's operations, in the event the clock mechanism is incorrect, a record may be made before the clock mechanism is changed opposite the letter "F" to indicate "from" and when the clock mechanism is set another record may be made opposite the letter "T" to indicate "to", thereby showing the time change, also indicated by the hole $b$, without change in mileage.

It will be noted that the mechanism 1, when mounted as shown in Fig. 1, serves as a desk for the operator or driver, that is, the wall 10a may be used as a table or desk, the wall 10b serving as a guard. In this arrangement the openings 3a and 89, knob 15 and button 16 are readily accessible, the clock dial is visible and the device 2 may be easily operated.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

In a machine for recording operations of a vehicle, the combination with a clock mechanism having a rotatable time indication changing member for changing the position of the clock hands, of a set of time recording discs driven by said clock mechanism, a movable platen, a movable web and an ink carrying ribbon between said discs and said platen, means for operating said platen to impress a record from said discs onto said web, a slidable and rotatable device normally disengaged from said time indication changing member and arranged to be manually operated into engagement therewith for rotating said member in either direction, and means operably connected at all times to said device and movable thereby to make an indication on said web when said device is shifted into engagement with said time indication changing member.

JOSEPH M. MARKLEY, Jr.